Oct. 23, 1928.  
H. K. SPENCER  
GRINDING MACHINE  
Filed Feb. 17, 1923  
1,689,176  
2 Sheets-Sheet 1

Inventor:
Henry K. Spencer,
by Emery, Booth, Janney & Varney Attys

Oct. 23, 1928.  1,689,176
H. K. SPENCER
GRINDING MACHINE
Filed Feb. 17, 1923  2 Sheets-Sheet 2

Inventor:
Henry K. Spencer,
by Emery, Booth, Janney & Varney
Attys

Patented Oct. 23, 1928.

1,689,176

UNITED STATES PATENT OFFICE.

HENRY K. SPENCER, OF WATERTOWN, MASSACHUSETTS, ASSIGNOR TO THE BLANCHARD MACHINE COMPANY, OF CAMBRIDGE, MASSACHUSETTS, A CORPORATION OF MASSACHUSETTS.

GRINDING MACHINE.

Application filed February 17, 1923. Serial No. 619,738

This invention aims to provide a novel and improved cooling means for vertical spindle grinding machines, and will be best understood by reference to the following description, when taken in connection with the accompanying drawings of one specific embodiment thereof, while its scope will be more particularly pointed out in the appended claims.

Figure 1:
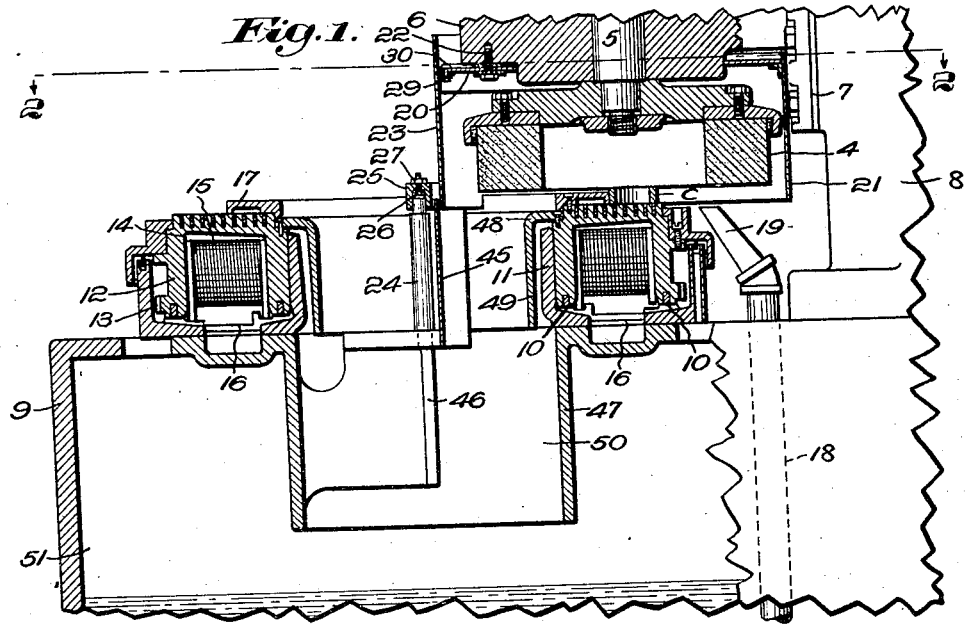
Fig. 1 is a vertical, sectional view, partly in elevation, of a vertical grinding machine exemplifying the invention.

Referring to the drawings, and to the embodiment of the invention which is selected for exemplification, there is shown (see Fig. 1) a metal working tool, specifically a vertical surface grinder, whose general characteristics are similar to that which is the subject matter of United States Letters Patent No. 1,182,861, dated May 9th, 1916, to which reference may be had for details not disclosed herein. The machine is provided with an annular abrasive wheel 4, mounted on a vertical spindle 5 carried by a wheel-head 6, which is mounted to slide vertically on ways 7 presented by a column 8, the latter being supported by a base 9.

Figure 2:
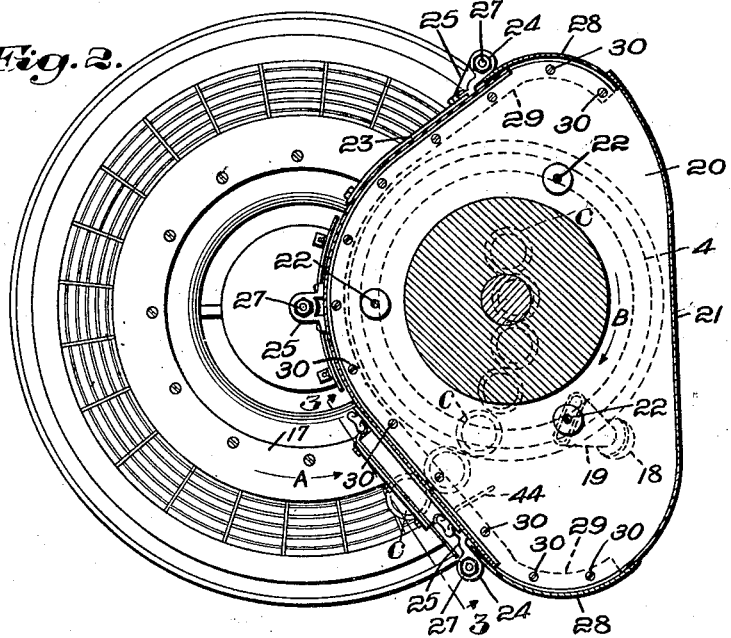
Fig. 2 is a sectional view on line 2—2 of Fig. 1.

The base provides support for annular horizontal bearings 10 and an annular vertical bearing 11 for a horizontally movable work support, herein a rotary chuck body 12 of magnetic material. The bearings 10 afford support for the chuck body, while the bearing 11 holds the same properly centered. The chuck body is rotated by suitable mechanism, herein a spur gear 13, which in practice is driven by a pinion not shown herein. The directions of rotation of the chuck body and the grinding wheel, respectively, are indicated by the arrows A and B in Fig. 2. Rotation of the chuck body carries beneath the grinding wheel work pieces C, which are supplied to the chuck body in any appropriate manner, and are carried in succession beneath the abrasive wheel, as will be evident from an examination of Fig. 2. The work support may be, and herein is, a magnetic chuck generally similar to that which is the subject matter of U. S. Letters Patent No. 1,125,198, issued to me January 19th, 1915. The chuck body presents a chamber 14 for electro-magnets, having windings 15, which in the present instance are secured to a stationary support 16. A ring 17 presents a guard which prevents inward lateral displacement of the work pieces due to the action of the abrasive wheel.

The abrasive wheel and the work pieces are cooled by a cooling medium such as cooling and lubricating liquid containing water, which is conducted from a suitable source under pressure through a conduit 18 having a nozzle 19, which directs the liquid toward the zone where the work pieces are first brought into contact with the wheel (see Fig. 2) in the direction of rotation of the wheel, and against the under side thereof, the nozzle being upwardly directed as shown in Fig. 1. The stream impinges on the wheel face at a point where the face is about to come into contact with the work being ground, and the nozzle is inclined at an angle to facilitate reaching this point, and to give the liquid a component of velocity in the same direction as the motion of the wheel face, so that the liquid will tend to be carried along by the wheel. In actual operation, so large a volume of liquid is discharged that some of it finds its way into the open space in the center of the wheel, and may be there whirled around with the wheel and discharged under the wheel face at some other point or points. By this means, the wheel and the work pieces are adequately cooled and lubricated. One factor in this result is the ability to deliver a larger volume of liquid than is practicable with other arrangements of the supply conduits. A further important advantage of this arrangement is that it avoids the use of passages in the wheel-head and face-plate which are likely to become clogged with dirt. I am enabled to employ a solid face plate to carry the wheel, thus keeping water away from the spindle bearing above the face-plate.

When the nozzle is mounted in fixed position vertically, as in the present case, a considerable variation in the heights of work can be accommodated, usually varying from zero up to two or three inches. For work of greater height, a different nozzle can be substituted, reaching to a greater height but discharging the stream at the same angle and in the same general relation to the wheel.

Outward and upward dispersion of the water is limited by shielding means, herein including two cooperating, relatively movable shields, one comprising a horizontally disposed plate 20 and a vertically disposed plate 21 carried by the wheel-head, and suitably secured thereto as by screws 22, and the other comprising a vertically disposed plate 23 supported on the base of the machine, as by posts 24 and brackets 25, each of the latter (see Fig. 1) being chambered as at 26 to receive the upper end of the post, and provided with an adjusting screw 27 to determine the height of the shield.

Herein, for convenience of manufacture and assembly, two other vertical plates 28, constituting in effect prolongations of the plate 23, are secured to the latter, and overlap the ends of the plate 21, which it will be remembered is carried by the vertically movable wheel-head. The direction of overlap of these plates at one end differs from that at the other end, as this arrangement is best calculated to prevent leakage of water at the joints which they present, the direction of the lap, of course, being determined by the direction of rotation of the abrasive wheel, which in this instance is clockwise as viewed in Fig. 2. Inasmuch as relative movement takes place between the plates 20 and 23, I have provided a suitable packing, herein a rubber flap 29, shown in cross-section in Fig. 1, which extends along the margin of the plate 20, as indicated by dotted lines in Fig. 2, and is secured to the plate 20 as by bolts 30. This flap, being downwardly directed and resting against the inner surface of the plates 23 and 28, naturally tends to spring in an outward direction against the latter, and in addition is forced in the same direction by the liquid. It follows that escape of liquid in an upward direction about the margin of the plate 20 is effectually prevented.

Figure 3:
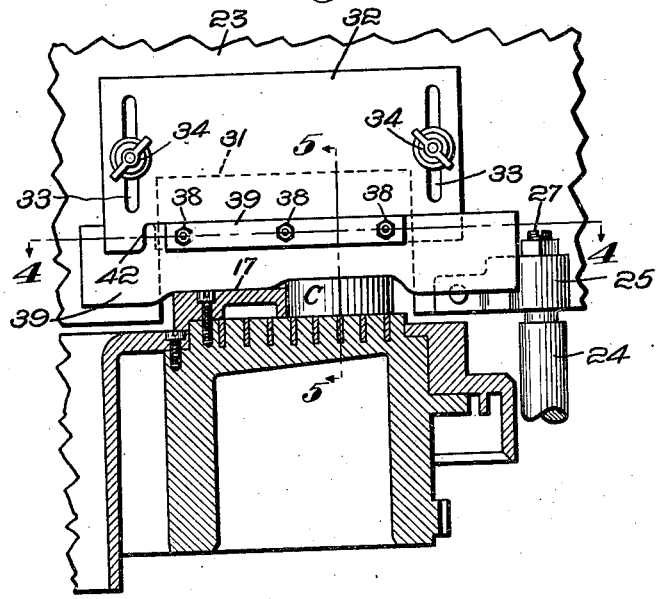
Fig. 3 is a sectional view on an enlarged scale on line 3—3 of Fig. 2.
Figure 4:
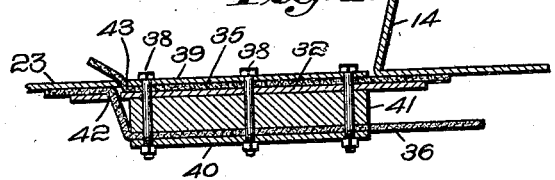
Fig. 4 is a sectional view on line 4—4 of Fig. 3.
Figure 5:
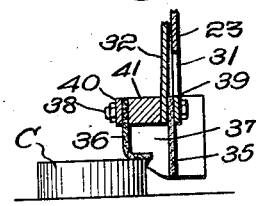
Fig. 5 is a sectional view on line 5—5 of Fig. 3.

It is of course desirable that the shielding means shall extend in a downward direction as near as possible to the work-support, but it is also evident that there must be considered the fact that the work-pieces project to a greater or less extent above the upper surface of the work-support. There is also to be considered the thickness of the ring 17, which is used to prevent inward displacement of the work-pieces. In the present example, the vertical shields for the most part extend to about the level of the upper surface of the work support, and in fact slightly below said surface (see Fig. 3), but to permit the entrance of the work pieces and the ring to and their exit from the shield, the plate 23 is cut away to provide openings 31 on opposite sides, and the vertical dimensions of these openings is regulated by adjustable shutters 32 provided with vertical slots 33 to receive clamping screws 34. An appropriate packing, herein a flexible flap 35 conveniently made of rubber, secured to the lower edge of the shutter, rests upon the work-pieces and upon the ring, and prevents the escape of any substantial amount of water along the upper surfaces thereof.

Still better results are obtained by using a second flap 36, spaced from the flap 35 a sufficient distance to present a chamber 37, which may be likened to a vestibule having inner and outer doors, one closing before the other opens, and thereby giving excellent results when used in connection with a succession of work pieces which present gaps or openings such as those shown in the drawings. Herein, both flaps are conveniently secured to the adjustable shutter by bolts 38, which extend through the flaps and the shutter, as well as through inner and outer clamps 39 and 40 and an intermediate spacer 41. At that end of the shutter toward which the stream is directed, the ends of the flaps are turned inwardly, the better to prevent the escape of liquid. The inwardly turned end of the flap 36 is conveniently held in a slot 42 in the shutter, while the corresponding end of the flap 35 extends into an opening 43 between the end of the shutter and the end of the entrance opening 31. At one side of the entrance opening 31, adjacent the nozzle 19, part of the metal which is cut to form the opening is bent inward as at 44 to present a tongue which, in practice, is found to prevent the escape of water that would otherwise occur at that point.

By reference to the central portion of Fig. 1, it will be noted that a portion of the plate 23 depends a considerable distance below the lower surface of the abrasive wheel 4, and cooperating therewith is another plate 45, which constitutes a downward prolongation thereof, thereby presenting a baffle to prevent the escape of liquid in a horizontal direction at this point. The plate 45 is conveniently secured to a support 46, which projects from the internal surface of a depending, annular flange 47, which is conveniently formed integrally with the base. The depending baffle deflects the water, and causes it to descend into an opening presented by an annular guard 48, which is secured to the chuck and has a depending skirt 49 to protect the bearings 10 and 11 from water and chips, which might otherwise find their way into the bearings. The water, therefore, gravitates through this guard and through an opening 50 into a resrevoir 51 presented by the base of the machine, and from this reservoir water is again taken and discharged through the nozzle onto the abrasive wheel and the work. In this way, a continuous circulation of the water is maintained.

Having thus described one embodiment of the invention, but without limiting myself thereto, what I claim and desire by Letters Patent to secure is:

1. In an abrading machine, the combination of an abrading tool, means for supplying fluid to cool said tool and the work and to carry away the material removed by said tool, an annular work-support which rotates about a generally vertical axis, a bearing for said work-support, and a guard encircled by said bearing and protecting the same from said fluid and said material.

2. In an abrading machine, the combination of an abrading tool, means for supplying fluid to cool said tool and the work and to carry away the material removed by said tool, an annular work-support which rotates about a generally vertical axis, a bearing for said work-support, and an annular guard encircled by said bearing, said guard being secured to said work-support and presenting a depending skirt which protects said bearing from said fluid and said material.

3. In a metal working machine, the combination of a metal removing tool, a travelling carrier for the work, means for directing fluid toward said tool and said work, and shielding means to limit the dispersion of said fluid, said shielding means including two yielding walls adapted to rest upon said work, one in advance of the other considered with reference to the direction of travel of said work.

4. In a metal working machine, the combination of a metal removing tool, a travelling carrier for the work, means for directing fluid toward said tool and said work, and shielding means to limit the dispersion of said fluid, said shielding means including a flexible wall adapted to rest upon and conform to the shape of said work, and means providing for adjustment of said wall for work of various dimensions.

5. In a metal working machine, the combination of a metal removing tool, a travelling carrier for the work, means for directing fluid toward said tool and said work, and shielding means to limit the dispersion of said fluid, said shielding means including a flexible wall adapted to rest upon and conform to the shape of said work, and means providing for adjustment of said wall toward and from said carrier.

6. In a metal working machine, the combination of a metal removing tool, a travelling carrier for the work, means for directing fluid toward said tool and said work, and shielding means to limit the dispersion of said fluid, said shielding means including two resilient walls adapted to rest upon said work, one in advance of the other considered with reference to the direction of travel of said work, and to yield in such direction when encountered by said work, and means providing for adjustment of said walls toward and from said carrier.

7. In a metal working machine, the combination of a metal removing tool, a travelling carrier for the work, means for directing fluid toward said tool and said work, and shielding means to limit the dispersion of said fluid, said shielding means including a wall presenting an opening for the travel of said work therethrough, an adjustable shutter for said opening, and a packing carried by said shutter and adapted for engagement with said work.

8. In a metal working machine, the combination of a metal removing tool, a travelling carrier for the work, means for directing fluid toward said tool and said work, and shielding means to limit the dispersion of said fluid, said shielding means including a wall presenting an opening for the travel of said work therethrough, a shutter for said opening, means providing for adjustment of said shutter toward and from said work, and a yielding wall carried by said shutter and adapted for engagement with said work.

9. In a metal working machine, the combination of a metal removing tool, a travelling carrier for the work, means for directing fluid toward said tool and said work, and shielding means to limit the dispersion of said fluid, said shielding means including a wall presenting an opening for the travel of said work therethrough, a shutter for said opening, means providing for adjustment of said shutter toward and from said work, and a flap carried by said shutter adapted for engagement with said work and adapted to yield in the direction of travel of said work.

10. In a metal working machine, the combination of a metal working tool, a tool carrier, a frame including a column presenting a vertical guide for said tool carrier, a horizontally travelling carrier for the work, means for directing liquid in proximity to said tool and the work, and shielding means to limit dispersion of the liquid, said shielding means including a generally horizontal shield carried by said tool carrier above said tool, a generally vertical shield carried by said tool carrier between said tool and said guide, and a generally vertical shield mounted on said frame independently of said tool carrier, said vertical shields contacting with each other, and said horizontal shield contacting with the second-mentioned vertical shield.

11. In a metal working machine, the combination of a metal working tool, a tool carrier, a frame including a column presenting a vertical guide for said tool carrier, a horizontally rotatable work carrier presenting an opening, means for directing liquid in proximity to said tool and the work, and shielding means to limit dispersion of the liquid, said shielding means having a portion which depends into said opening.

12. In a metal working machine, the combination of an annular work support, an axially movable rotary tool carrying head, the circle of rotation of which intersects the annulus of said work support, means for directing cooling fluid toward the contacting area of said tool and the work, and a shield surrounding said tool head, that portion whereof that intersects said annulus lying closely adjacent to the work supporting surface, said shield comprising a fixed part which within the annulus extends on both sides of the plane of the work supporting surface, and a movable part, the edges of which lap those of the fixed part and which is mounted upon the tool carrying head.

In testimony whereof, I have signed my name to this specification.

HENRY K. SPENCER.